US006016594A

United States Patent [19]

[11] Patent Number: 6,016,594
[45] Date of Patent: Jan. 25, 2000

Frey

[54] TOOL AND METHOD FOR INSTALLING AND REMOVING BALL AND SPRING DETENT

[76] Inventor: Donald L. Frey, 8402 Harris Ave., Parkville, Md. 21234

[21] Appl. No.: 08/909,231

[22] Filed: Aug. 11, 1997

[51] Int. Cl.[7] .......... B23P 6/00

[52] U.S. Cl. .......... 29/402.08; 29/426.1; 29/451; 81/424.5; 81/426.5

[58] Field of Search .......... 29/426.6, 451, 29/225, 227, 270, 283, 402.03, 402.08, 426.1; 81/424.5, 426.5

[56] References Cited

U.S. PATENT DOCUMENTS

| | | | |
|---|---|---|---|
| 463,563 | 11/1891 | Williamson . | |
| 1,440,377 | 1/1923 | Crumley | 29/270 X |
| 1,445,908 | 2/1923 | Perkins . | |
| 1,704,548 | 3/1929 | Alberg . | |
| 1,775,022 | 9/1930 | Dodge | 29/270 |
| 1,850,268 | 3/1932 | Kulp et al. . | |
| 1,895,668 | 1/1933 | Junkers | 29/283 |
| 2,555,591 | 6/1951 | Kane, Jr. | 285/122 |
| 2,586,222 | 2/1952 | Hamilton | 29/283 |
| 2,815,777 | 12/1957 | Iraids | 144/293 |
| 3,061,341 | 10/1962 | Grzych et al. | 29/451 |
| 5,544,400 | 8/1996 | Wells | 29/227 |

*Primary Examiner*—Joseph M. Gorski
*Attorney, Agent, or Firm*—Leonard Bloom

[57] ABSTRACT

A tool to install and remove a ball and spring detent in a gear box on a support system for a trailer. The tool has a pair of arms with respective jaw portions. A respective arcuate member is pivotally attached to the tip of each jaw portion, each arcuate member being offset from the tip of the jaw portion. A method of removing and installing the spring and ball detent is disclosed.

2 Claims, 5 Drawing Sheets

TOOL AND METHOD FOR INSTALLING AND REMOVING BALL AND SPRING DETENT

BACKGROUND OF THE INVENTION

The present invention relates to a tool to install and remove ball and spring detent means and, more particularly, to a specialized tool for use within the gear box of a support system for a tractor-trailer.

Trailers which are attached to tractors and commonly known as "18 wheel tractor-trailers" are frequently removed from the tractor and parked. The parking procedure requires that a pair of legs be lowered from beneath the trailer to support the end of the trailer which otherwise would be supported by the tractor. The legs are part of a support system or "landing gear" which has a frame on which the legs are mounted, a gear box and a hand crank to operate with the gear box for raising and lowering the legs. The hand crank is connected to a cylindrical shaft which can be moved to two positions for more rapid or more slow movement of the legs by use of the selected gears within the gear box. A ball and spring detent within a transverse bore in the cylindrical shaft permits movement to the selected position. When the gear box is opened for repairs or maintenance, it is quite common for the detent means to be uncovered and the ball (or balls) is ejected form the bore by the spring. Frequently, the spring is also lost from the bore. It is extremely difficult to replace the ball and spring and, in many instances, the mechanic does not replace the ball and spring. It is estimated that at least one third of the trailers on the road today do not have the detent means in place. The truck operator is unaware of the absence of the ball and spring and attempts to use the hand crank in the normal manner. The shaft can move longitudinally and "kick" resulting in the crank moving suddenly and violently to cause injuries to the arm, head or body of the operator. In other cases, the ball and/or spring, after ejection from the bore, became lodged in the gears in the gear box and caused the gears to jam. The operator cannot move the landing gear and there is a hazard that the trailer weighing 10 tons or more is unstably parked.

A further complication in replacing or removing the ball and spring detent means is that the gear box can be opened only to a limited extent before the bushing in the gear box cover no longer retains the ball and spring in the transverse bore. The limited opening of the gear box severely restricts access to the cylindrical shaft and the transverse bore in which the ball and spring detent means are disposed. The mechanic working on the gear box has an opening of two to three inches or less to work within the gear box.

U.S. Pat. No. 463,563 to Williamson disclosed a combined tongs and pinchers having ends oppositely and outwardly curved and forming an approximately circular end when the arms or shanks are closed. The ends are provided with eyes through which pass pivots that secure jaws to the inner faces of eyes and permit the jaws to turn or rotate to present their tines or points or their flat surfaces to form a pair of tongs or pinchers as desired.

U.S. Pat. No. 1,445,908 to Perkins disclosed dish holding tongs wherein the flat holding pads have an adjustable or tilting movement.

U.S. Pat. No. 1,704,548 to Alberg disclosed tongs having bowed metal jaws secured to handles for holding fire logs.

Kulp et al in U.S. Pat. No. 1,850,268 disclosed spring-pressed or yielding arms pivotally mounted on their respective jaws at a point preferably about half way of the length thereof by headed over pivot pins passing through the rear portion of arms and the adjacent portion of jaws respectively.

Kane, Jr. in U.S. Pat. No. 2,555,591 disclosed a pipe coupling wherein a semicircular vise or shoe is pivotally mounted to the distal ends of curved portions of levers. The two semi-circular shoes match together to form an annular ring and form a clamp with respect to a pipe.

In U.S. Pat. No. 2,815,777 Iraids disclosed a spring-actuated miter clamp with pivotally mounted jaw members to engage and grip surfaces at any angle relative to one another.

None of the references are directed to a detent means in a gear box and none of the devices have arcuate members having an end pivotally connected to the tip of the arm.

Thus, there is a need for a tool to be used for removal and installation of a ball and spring detent in a confined space.

BRIEF SUMMARY OF THE INVENTION

It is an object of the present invention to provide a tool which is usable in confined spaces to remove and install ball and spring detent means.

It is a further object of the present invention to provide a tool which can be used in the gear box on the landing gear of a trailer.

In accordance with the teachings of the present invention, there is disclosed a tool to install and remove a ball and a spring detent means in a confined location within a gear box in a support system for a tractor trailer. The tool has a pair of plier type arms pivotally joined together at a pivot point. Each arm has a handle portion and a opposite jaw portion. Each jaw portion has a respective tip. A respective arcuate member is pivotally attached to the tip of each jaw portion. When the arms are pivotally moved to bring the jaw portions in proximity to one another, the arcuate members are opposed to one another defining a partial sleeve to permit the jaw portions to engage a cylindrical shaft within the gear box. In this manner, the ball and spring may be received in a transverse bore in the cylindrical shaft and temporarily retained therein by the arcuate members of the tool until a bushing is disposed over the ball and spring detent means to permanently retain the detent means in the transverse bore. The tool may be removed without loss of the ball and spring. Each arcuate member has a first end, a second end and a length therebetween. The first end of each arcuate member is pivotally connected to the tip of the respective jaw portion and the second end of each arcuate member extends outwardly from the tip of the respective jaws. This structure permits the tool to be moved to permit grasping of the cylindrical shaft from different angles in confined locations.

In another aspect, there is disclosed a method of using a tool to install at least one ball and a spring detent means in a confined location within a gear box on a support system for a tractor trailer. The method includes the following steps: A pair of plier type arms are provided pivotally joined together at a pivot point. Each arm has a handle portion and an opposite jaw portion. Each jaw portion has a respective tip. A respective arcuate member is pivotally attached to the tip of each jaw portion. When the arms are pivotally moved to bring the jaws in proximity to one another, the arcuate members are opposed to one another defining a partial sleeve to permit the jaws to engage a cylindrical shaft within the gear box. The gear box is opened and a bushing member is slid in a longitudinal direction along the cylindrical shaft to provide access to a transverse bore in the cylindrical shaft. The handle portions of the tool are grasped with one hand.

The at least one ball and the spring are inserted in the transverse bore in the cylindrical shaft with the other hand. The handle portions are moved to dispose the arcuate members about the cylindrical shaft wherein one of the arcuate members contacts the at least one ball and compresses the spring within the transverse bore. A bushing member is slid in the opposite longitudinal direction along the cylindrical shaft and over the arcuate members. The tool is slid in the opposite longitudinal direction along the cylindrical shaft to remove the arcuate members from between the cylindrical shaft and the bushing member. In this manner, the at least one ball and spring detent means are retained within the transverse bore by the bushing member without loss of the at least one ball and spring. The tool is removed from the gear box and the gear box is closed.

In still another aspect, there is disclosed a method of using a tool to remove a ball and a spring detent means in a confined location within a gear box on a support system for a tractor trailer. The method includes the following steps: A pair of plier type arms are provided pivotally joined together at a pivot pont. Each arm has a handle portion and an opposite jaw portion. Each jaw portion has a respective tip. A respective arcuate member is pivotally attached to the tip of each jaw portion. When the arms are pivotally moved to bring the jaws in proximity to one another, the arcuate members are opposed to one another defining a partial sleeve to permit the jaws to engage a cylindrical shaft within the gear box. This gear box is opened to provide access to the cylindrical shaft. The handle portions of the tool are grasped with one hand. The handle portions are moved to dispose the arcuate members about the cylindrical shaft, the cylindrical shaft having a transverse bore formed therein. The transverse bore has disposed therein a spring with at least one ball juxtapostioned to the spring. The tool is slid in a longitudinal direction along the cylindrical shaft wherein the arcuate members are disposed between the cylindrical shaft and a bushing disposed over the transverse bore in the cylindrical shaft. In this manner, one of the arcuate members contacts the ball in the transverse bore. The sleeve is slid in the longitudinal direction wherein the bushing is removed from the arcuate members. The handle portions of the tool are carefully moved to move the one of the arcuate members away from the cylindrical shaft wherein, in a controlled manner, the at least one ball is urged by the spring out of the transverse bore and the at least one ball and opening are removed safely without loss.

These and other objects of the present invention will become apparent from a reading of the following specification taken in conjunction with the enclosed drawings.

DESCRIPTION OF THE PREFERRED EMBODIMENT

Figure 1:
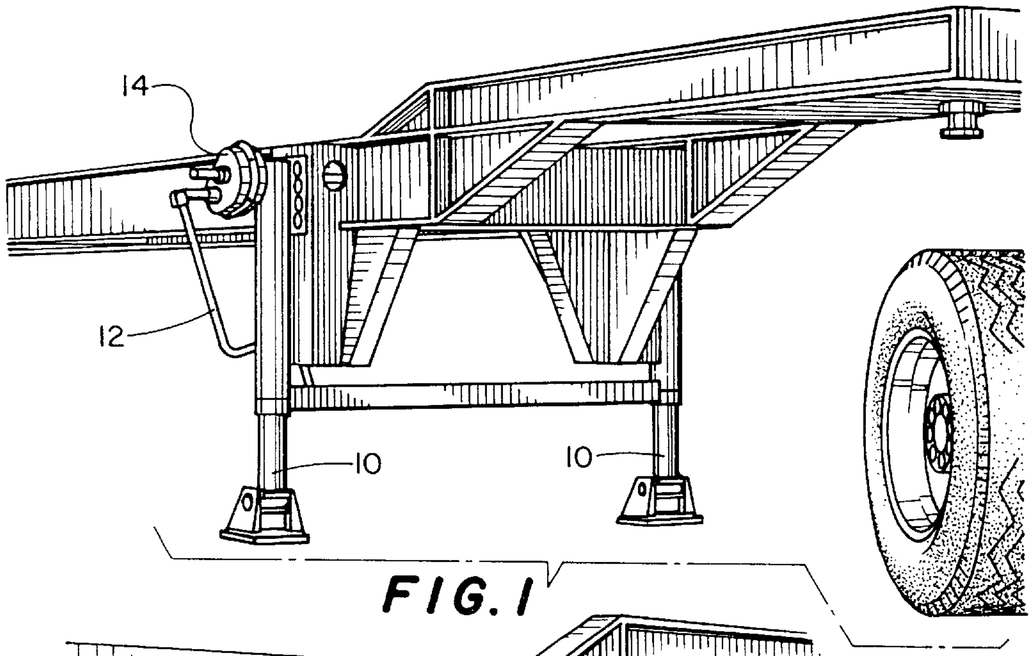
FIG. 1 is a perspective view of the support system for the trailer adjacent to the tractor.
Figure 2:
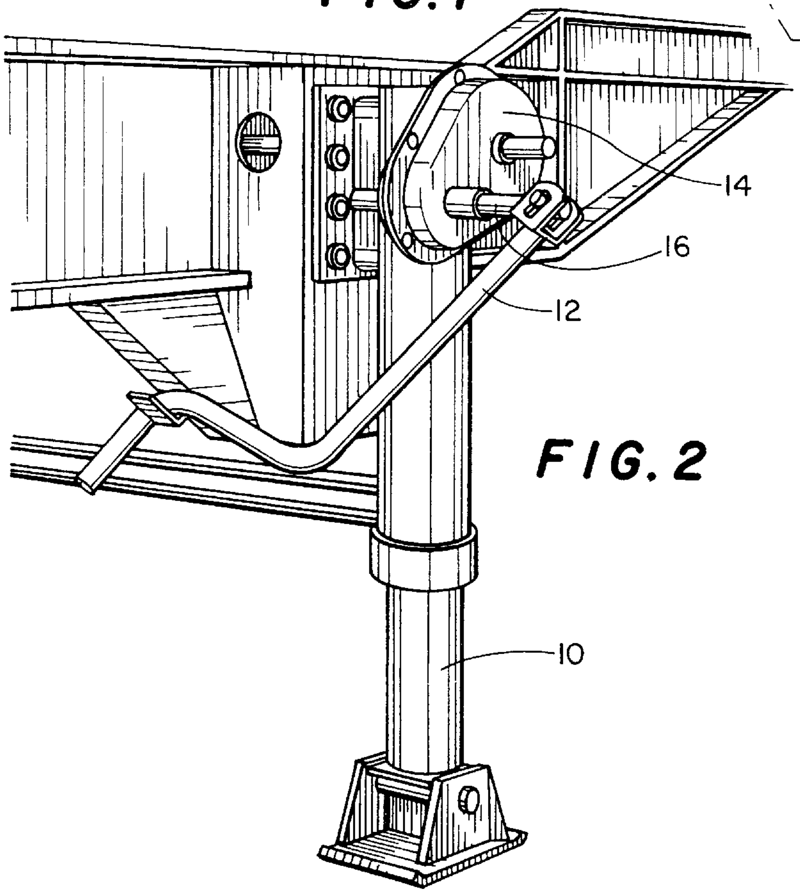
FIG. 2 is a perspective view of the gear box and crank on the support system for the trailer.

As shown in FIGS. 1 and 2, the support system for a trailer to be attached to a tractor is a frame having a pair of legs 10 which are raised and lowered by a crank 12 connected to a gear box 14. Two sets of gears are contained within the gear box 14 to permit more rapid and more slow cranking of the legs 10. The crank 12 is movable longitudinally toward or away from the gear box 14 to select the set of gears before rotating the crank 12 to elevate or lower the legs 10. The crank 12 is pivotally connected to a cylindrical shaft 16 which extends through the gear box 14 and has two positions controlled by a detent means 18 on the shaft 16 as will be discussed.

Figure 3:
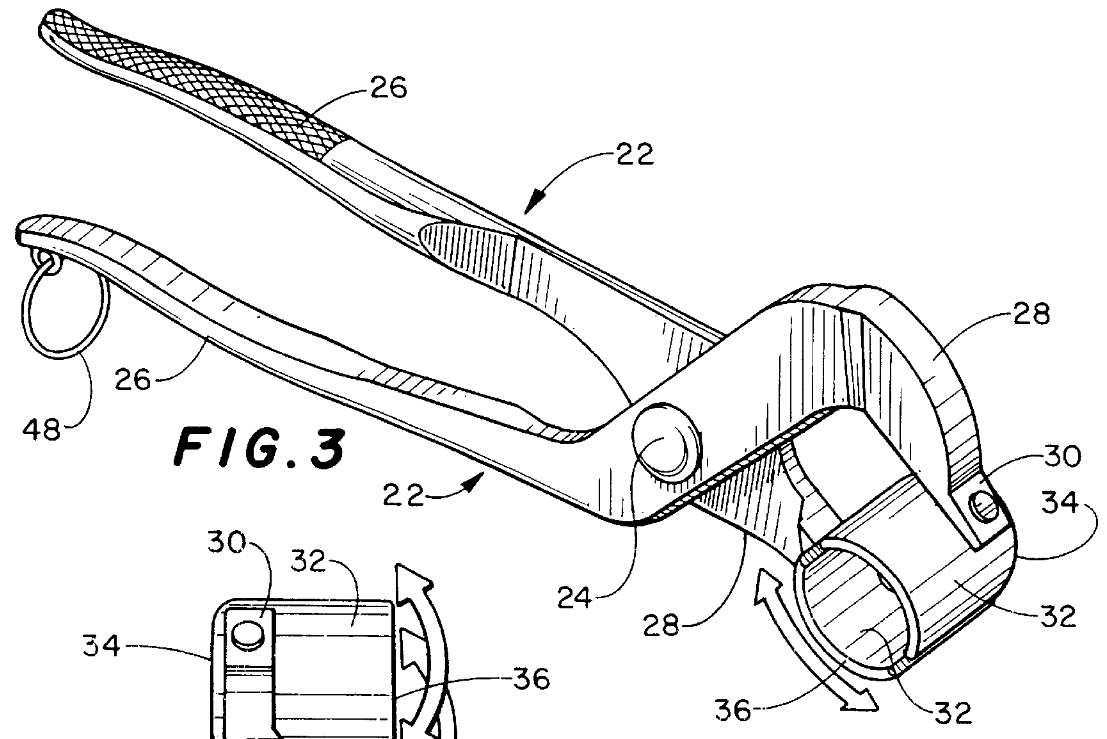
FIG. 3 is a perspective view of the tool of the present invention.
Figure 4:
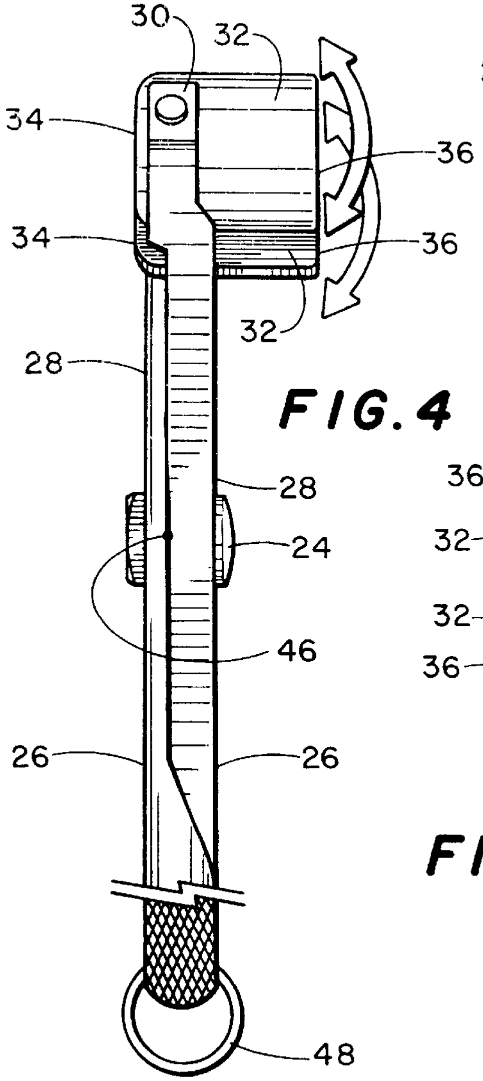
FIG. 4 is a top plan view of the tool of the present invention.
Figure 5:
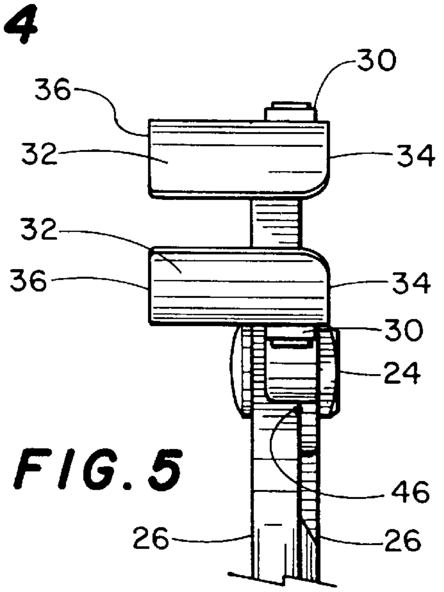
FIG. 5 is a partial front elevation view of the tool of the present invention.
Figure 6:
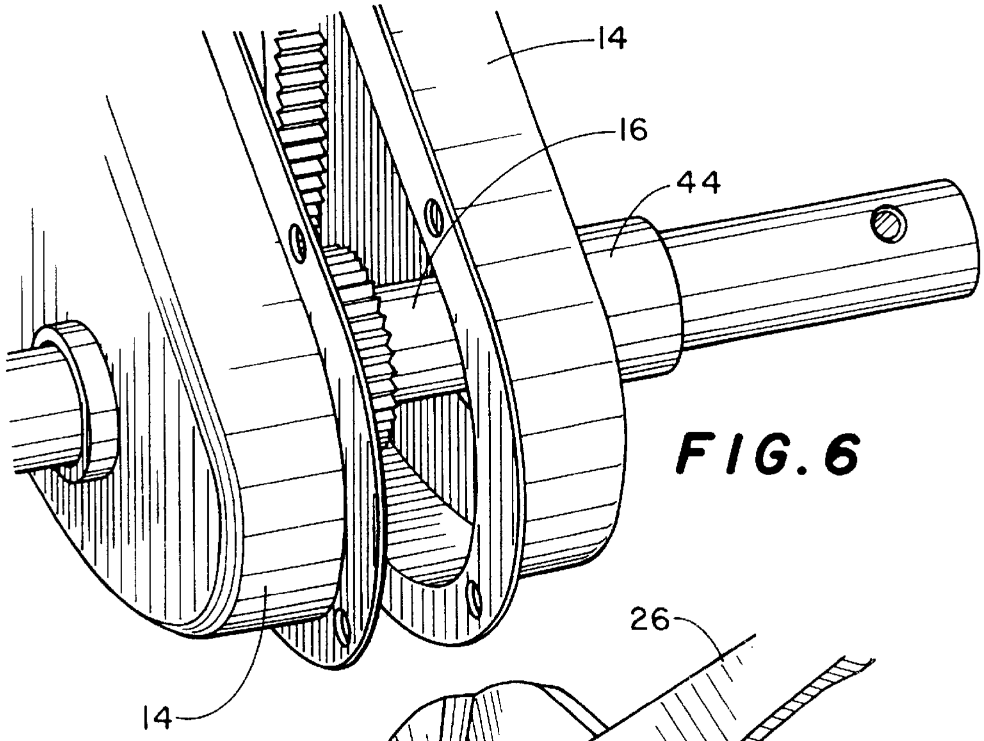
FIG. 6 is a perspective view showing the gear box partially opened.
Figure 7:
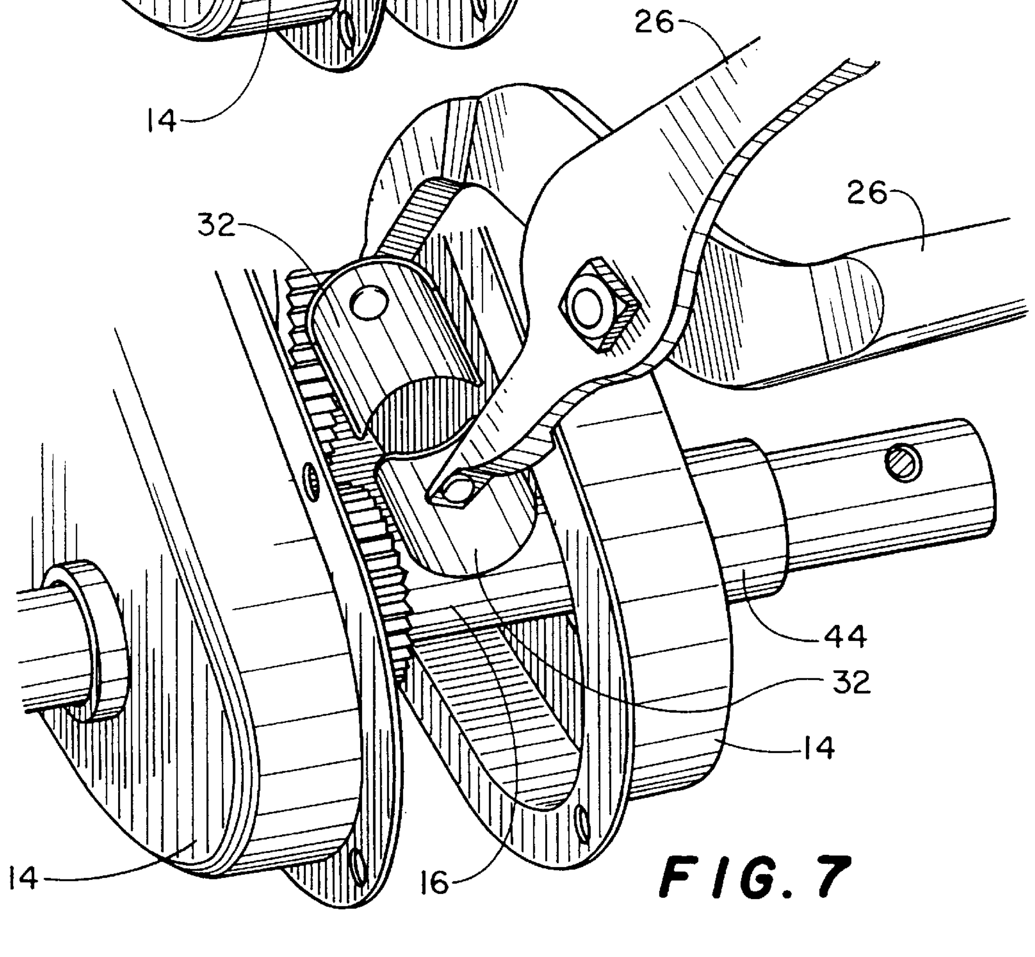
FIG. 7 is a perspective view showing the tool of the present invention being inserted into the gear box of FIG. 6.

The tool 20 of the present invention (FIGS. 3–5) is a pair of plier type arms 22 pivotally joined together at a pivot point 24. Each arm 22 has a handle portion 26 on one side of the pivot point 24 and an opposite jaw portion 28 on the other side of the pivot point 24. Each jaw portion 28 has a respective tip 30. A respective arcuate member 32 is pivotally attached to the tip 30 of each jaw portion 28. When the arms 22 are moved about the pivot point 24 to bring the jaw portions 28 in proximity to one another, the arcuate members 32 are opposed to one another defining a partial sleeve to permit the arcuate members 32 to engage the cylindrical shaft 16 within the gear box 14.

Each arcuate member 32 has a first end 34 and an opposite second end 36 with a respective length between the respective ends. The first end 34 of each arcuate member 32 is pivotally connected to the respective tip 30 of the jaw portion 28 (see arrows on FIGS. 3 and 4). The second end 36 of each arcuate member 32 extends outwardly from the respective tip 30 of the jaw portion 28 so that the arcuate members 32 are offset from the respective tips 30. The tool 20 may be moved to permit the arcuate members 32 to be pivotally moved to permit grasping of the cylindrical shaft 16 from different angles in working within the confined space in the gear box 14. The offset connection and the pivotability of the arcuate members 32 permit the user of the tool 20 to insert the jaw portions 28 of the tool 20 into a confined space and to maneuver the tool 20 to enable the arcuate members 32 to be properly aligned to grasp the cylindrical shaft 16.

Referring now to FIGS. 6–11, the method of using the tool 20 is shown. The gear box 14 is opened to gain access to the cylindrical shaft 16. The cylindrical shaft 16 has a transverse bore 42 therein in which there is a detent means. The detent means is at least one ball 38 (and preferably two) which are disposed at the ends of a spring 40. As discussed above, the spring 40 and balls 38 are frequently not in the transverse bore 42 because the repair person was unable to replace them and reassemble the gear box. In this situation, when the gear box 14 is opened, the one portion of the gear box is slid in a first longitudinal direction as shown by the arrows in FIG. 8 to provide access to the transverse bore 42. The handle portions 26 of the tool 20 is grasped by one hand of the user. The at least one ball 38 and spring 40 are inserted in the transverse bore 42. It is preferred that a heavy grease be applied to the ends of the spring 40 to assist in retaining the at least one ball 38 on the end of the spring 40. The handle portions 26 of the tool 20 are manipulated so that the arcuate members 32 are about the cylindrical shaft 16 and contact the at least one ball 38. The arcuate members 32 contact the at least one ball 38 and compress the spring 40 within the transverse bore 42. The portion of the gear box 14 having a bushing 44 around the cylindrical shaft 16 is slid in a second opposite longitudinal direction along the cylindrical shaft 16 and over the arcuate members 32. The inner diameter of the bushing 44 is greater than the outer diameter of the cylindrical shaft 16 plus the thickness of the arcuate members 32. The tool 20 is then slid along the cylindrical shaft 16 in the second longitudinal direction to remove the arcuate members 32 from between the bushing 44 and the cylindrical shaft 16. The at least one ball 38 and spring 40 detent means are retained within the transverse bore 42 by the bushing 44 without loss of the ball(s) and/or spring. The tool 20 is removed from the gear box 14 and the gear box 14 is secured in a closed position.

Figure 8:
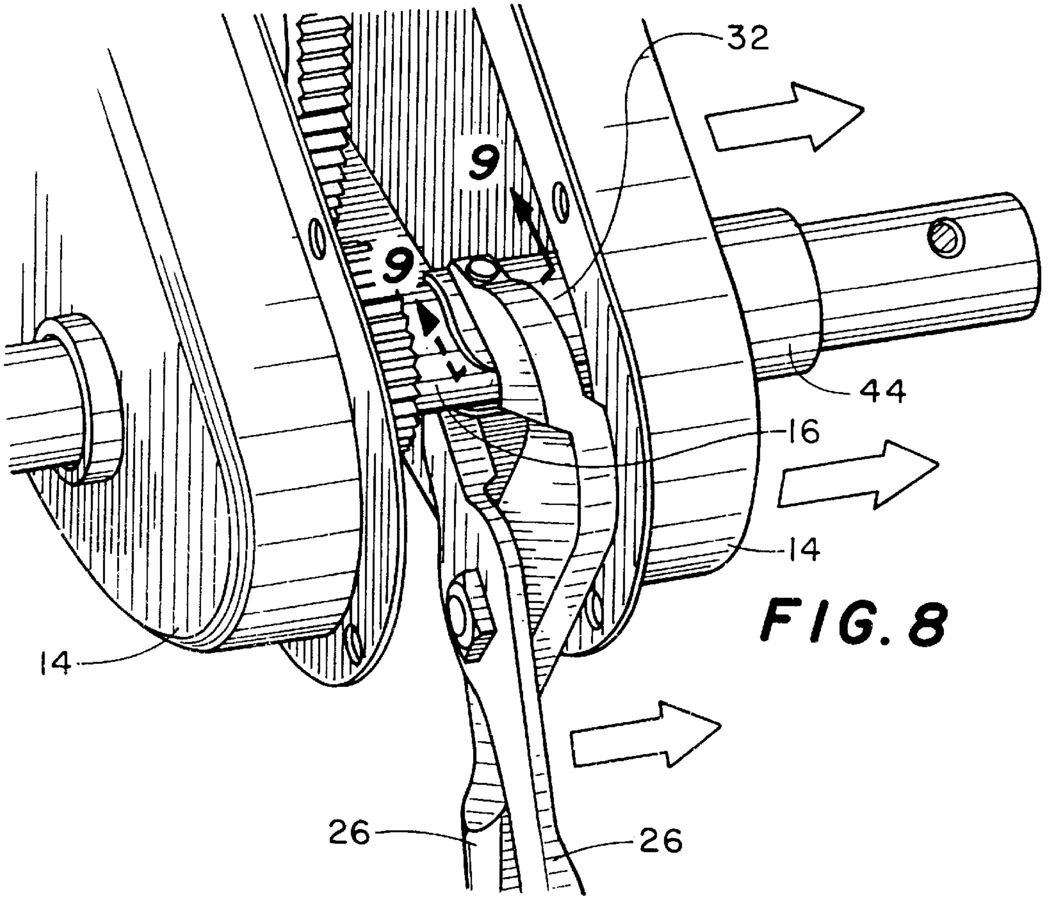
FIG. 8 is a perspective view showing the tool of the present invention holding the spring and ball detent as the portion of the gear box is moved longitudinally along the shaft.
Figure 9:
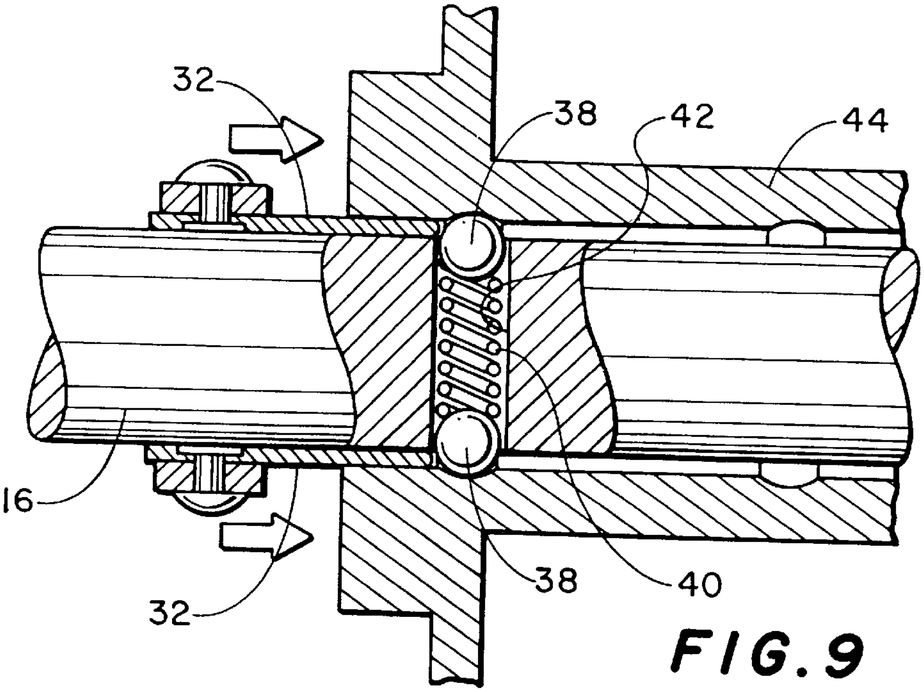
FIG. 9 is a cross sectional view taken across the lines 9—9 of FIG. 8.
Figures 10, 11:
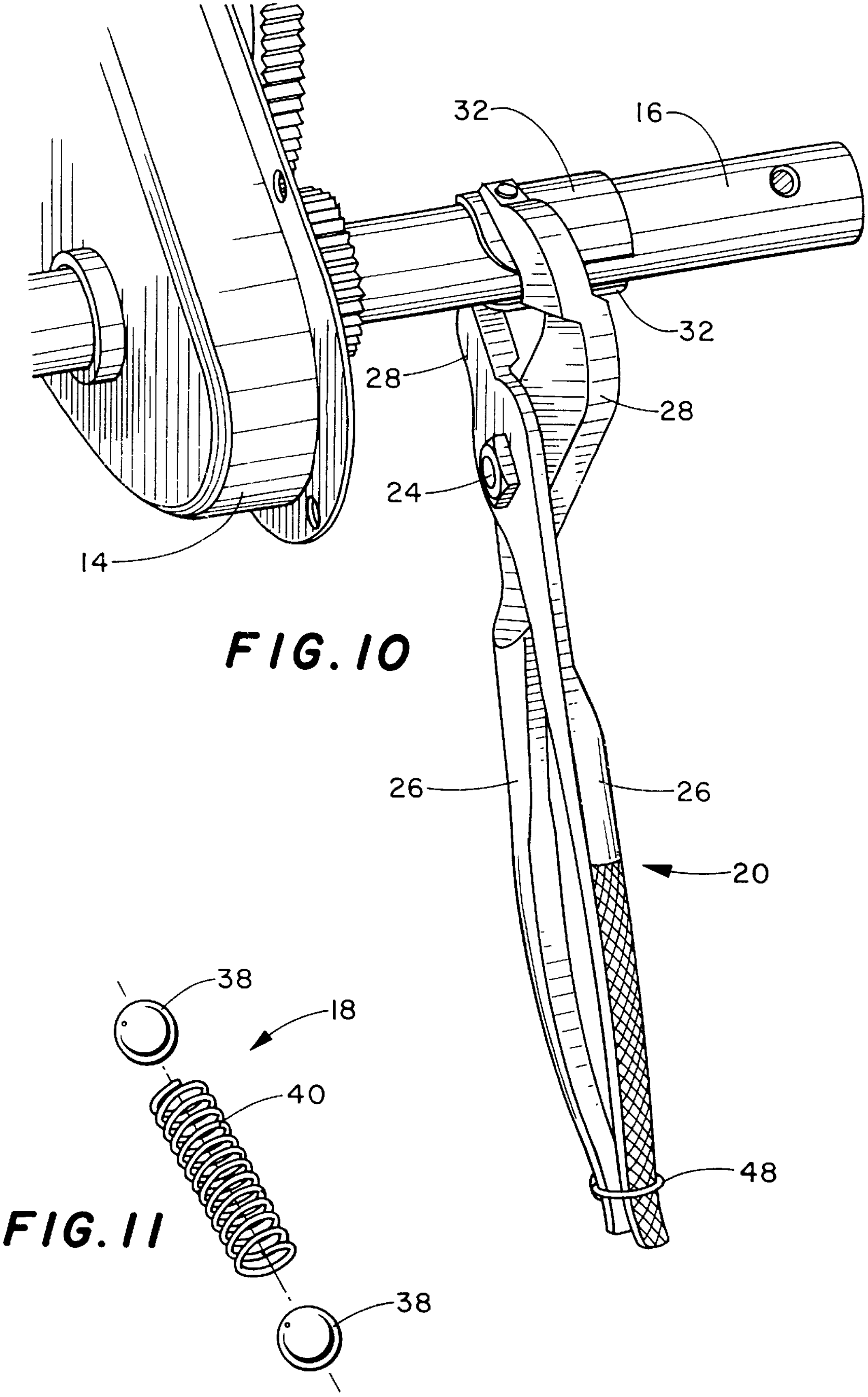
FIG. 10 is a perspective view showing the tool of the present invention grasping the cylindrical shaft in the gear box with one portion of the gear box removed for ease of visibility.
FIG. 11 is a perspective view of the spring and ball detent means.

In order to safely remove the at least one ball 38 and spring 40 detent means, the tool 20 is used in a similar manner. The gear box 14 is opened and the portions of the gear box 14 are carefully separated to provide access to the cylindrical shaft 16 while assuring that the bushing 44 covers the transverse bore 42. The opening between the gear box portions may be approximately two (2) to three (3) inches. The tool 20 is held by the user and maneuvered so that the arcuate members 32 grasp the cylindrical shaft 16. The tool 20 is slid in the first longitudinal direction along the cylindrical shaft 16 so that the arcuate members 32 are disposed between the cylindrical shaft 16 and the bushing 44 and are covering the detent means in the transverse bore 42. The bushing 44 is slid in the first longitudinal direction to uncover the arcuate members (FIGS. 8–10). The handle portions 26 of the tool are carefully manipulated to move at least one of the arcuate members 32 away from the transverse bore 42 such that at least one ball 38 is urged out of the transverse bore 42 by the spring 40. In this manner, the ball(s) 38 and spring 40 are safely removed from the transverse bore 42 without loss of the spring and/or ball and without injury to the user of the tool 20.

A washer 46 (plastic, belleville, etc.) may be disposed at the pivot point 24 to control movement of the arms.

A connecting means 48 may be movably attached to one of the handle portions 26, distal from the pivot point 24. The connecting means 48 may be an elastomeric ring, a garter spring or similar means. The connecting means 48 is releasably attachable to the other handle portion 26 to releasably secure the handles in a predetermined position with respect to one another. The connecting means 48 may be used when the tool 20 is grasping the cylindrical shaft 16 so that the user need not hold the tool in a grasping position with one hand, allowing the hand to be available to move the gear box portion.

The tool 20 of the present invention permits safe and controlled means to remove and install ball and spring detent means within the gear box of the support system for a trailer. The ball and spring are not lost and the support system can operate safely without danger to the truck operator or to the repair person working on the support system.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A method of removing a ball and spring detent means from a confined location within a gear box on a support system for a tractor trailer, comprising the steps of:

providing a gear box on a support system for a tractor trailer, wherein the gear box has a cylindrical shaft therein, the shaft has a bore extending transversely therethrough, the bore has a spring and two balls disposed therein, and a bushing surrounds said cylindrical shaft and covers said bore such that the bushing retains the spring and balls within the bore as the spring urges the balls outwardly;

providing a tool having:

a pair of arms pivotally joined to one another along a pivot axis, wherein each arm has a handle portion and an opposite jaw portion, and with each jaw portion having a tip portion; and an arcuate member attached to the tip portion of each jaw portion, such that when the arms are pivoted about the pivot axis relative to one another the arcuate members oppose one another and define a partial sleeve;

opening said gear box, thereby providing access to said cylindrical shaft;

grasping said handle portions of said tool with one hand; then;

moving said handle portions with said hand, thereby causing said arms to pivot relative to one another about said pivot axis such that said arcuate members form the partial sleeve about said cylindrical shaft; then sliding said tool and partial sleeve in a longitudinal direction along said cylindrical shaft such that each arcuate member becomes positioned between said bushing and said bore, whereby said arcuate members force said balls inwardly against said spring; then while said arcuate members continue to force said balls against said spring, sliding said bushing in said longitudinal direction along said cylindrical shaft, whereby said arcuate members become no longer positioned between said bushing and said bore; then moving said handle portions with said hand, thereby causing said arms to pivot relative to one another about said pivot axis such that said arcuate members move away from said cylindrical shaft, whereby said spring urges said balls outwardly from said bore; then capturing said balls while said balls are urged outwardly by said spring; and then capturing said spring and as said spring exits from said transverse bore.

2. A method of installing a ball and spring detent means in a confined location within a gear box on a support system for a tractor trailer, comprising the steps of:

providing a gear box on a support system for a tractor trailer, wherein the gear box has a cylindrical shaft therein, the shaft has a bore extending transversely therethrough and a bushing surrounds said cylindrical shaft and covers said bore, providing a tool having:

a pair of arms pivotally joined to one another along a pivot axis, wherein each arm has a handle portion and an opposite jaw portion, with each jaw portion having a tip portion, and an arcuate member attached to the tip portion of each jaw portion, such that when the arms are pivoted about the pivot axis relative to one another, the arcuate members oppose one another and define a partial sleeve, opening the gear box and sliding the bushing in a longitudinal direction along the cylindrical shaft thereby providing access to the bore, grasping the handle portions of the tool, with one hand, inserting two balls and a spring in the bore, with the other hand, such that the spring becomes disposed between the balls within the bore, moving the handle portions of the tool with the one hand, thereby causing the arms to pivot relative to one another about the pivot axis such that the arcuate members form the partial sleeve about the bore, whereby the sleeve contacts the balls and compress the spring within the bore, while the spring urges the balls outwardly, then sliding the bushing in an opposite longitudinal direction along the cylindrical shaft and over the sleeve, then sliding the tool in the opposite longitudinal direction along the cylindrical shaft thereby removing the sleeve from between the cylindrical shaft and the bushing, whereby the balls and spring are retained within the bore by the bushing without loss of the balls and spring, and then removing the tool from the gear box, and closing the gear box.

* * * * *